(12) United States Patent
Pettersson

(10) Patent No.: US 9,915,585 B2
(45) Date of Patent: Mar. 13, 2018

(54) WEAR-MONITORING OF A GEARBOX IN A POWER STATION

(75) Inventor: Bo Pettersson, London (GB)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 1135 days.

(21) Appl. No.: 14/000,156

(22) PCT Filed: Mar. 9, 2012

(86) PCT No.: PCT/EP2012/054095
§ 371 (c)(1),
(2), (4) Date: Aug. 27, 2013

(87) PCT Pub. No.: WO2012/123351
PCT Pub. Date: Sep. 20, 2012

(65) Prior Publication Data
US 2014/0046614 A1    Feb. 13, 2014

(30) Foreign Application Priority Data
Mar. 11, 2011  (EP) .................................. 11157943

(51) Int. Cl.
*G01L 25/00* (2006.01)
*G01M 7/00* (2006.01)
(Continued)

(52) U.S. Cl.
CPC .......... *G01M 13/021* (2013.01); *G01M 13/04* (2013.01)

(58) Field of Classification Search
None
See application file for complete search history.

(56) References Cited

U.S. PATENT DOCUMENTS

| 5,661,659 A | 8/1997 | Forecast et al. |
| 5,734,108 A * | 3/1998 | Walker .................... G01P 3/486 73/650 |

(Continued)

FOREIGN PATENT DOCUMENTS

| CN | 1896709 A | 1/2007 |
| CN | 101196174 | 6/2008 |

(Continued)

OTHER PUBLICATIONS

European Search Report dated Jul. 13, 2011 in European Patent Application No. EP 11160313.

*Primary Examiner* — Walter L Lindsay, Jr.
*Assistant Examiner* — Geoffrey T Evans
(74) *Attorney, Agent, or Firm* — Maschoff Brennan

(57) ABSTRACT

The invention relates to a method of monitoring a wear of a gearbox in a power station, such as a windmill, water-wheel or tidal power station, the gearbox comprising at least two shafts, cogwheels and bearings as components of the gearbox. The method comprises sensing an angular position at the shafts by a rotational shaft encoder and monitoring the wear of the transmission-unit according to differences of the sensed angular positions and generating a condition signal representative of the wear of the gearbox according to the monitored differences. The monitoring comprises an additional sensing of at least one additional degree of freedom, in particular an axial and/or eccentric displacement, of at least one of the shafts caused by wear of at least one of the components of the gearbox, and generating the condition signal according to the displacement and differences in the at least two degrees of freedom.

32 Claims, 4 Drawing Sheets

(51) Int. Cl.
*G01M 9/00* (2006.01)
*G01M 10/00* (2006.01)
*G01M 15/00* (2006.01)
*G01M 17/00* (2006.01)
*G01M 13/02* (2006.01)
*G01M 13/04* (2006.01)

(56) References Cited

U.S. PATENT DOCUMENTS

| | | | |
|---|---|---|---|
| 6,175,793 | B1 | 1/2001 | Ironside |
| 8,539,811 | B2 * | 9/2013 | Wilhelmy ............... F16C 19/52 702/182 |
| 9,458,835 | B2 * | 10/2016 | Ikeda ...................... F03D 17/00 |
| 2007/0118333 | A1 | 5/2007 | Miyasak et al. |
| 2007/0266781 | A1 | 11/2007 | Nemoto et al. |
| 2008/0041141 | A1 * | 2/2008 | Discenzo ................ G01L 1/241 73/66 |
| 2008/0100156 | A1 | 5/2008 | Gabsi et al. |
| 2008/0234964 | A1 | 9/2008 | Miyasak et al. |
| 2009/0152985 | A1 | 6/2009 | Yamada et al. |
| 2009/0288480 | A1 * | 11/2009 | Noda ...................... F01L 1/344 73/114.79 |

FOREIGN PATENT DOCUMENTS

| | | |
|---|---|---|
| CN | 101562409 | 10/2009 |
| CN | 101566523 A | 10/2009 |
| CN | 201408116 Y | 2/2010 |
| DE | 3924460 | 2/1990 |
| DE | 4340477 | 4/1995 |
| DE | 19642827 | 10/1997 |
| DE | 19750474 | 6/1999 |
| EP | 1632754 | 3/2006 |
| EP | 1890113 | 2/2008 |
| EP | 10157931.6 | 10/2011 |
| JP | 58034333 | 2/1983 |
| JP | S64-79639 A | 3/1989 |
| JP | 2005-069024 A | 3/2005 |
| JP | 2006-317310 A | 11/2006 |
| JP | 2007-198992 A | 8/2007 |
| JP | 2009-074841 A | 4/2009 |
| KR | 2007024230 | 3/2007 |
| WO | 94/24537 A1 | 10/1994 |
| WO | 2000/14474 | 3/2000 |
| WO | 2004/034010 | 4/2004 |
| WO | 2007/051575 | 5/2007 |
| WO | 2008/083797 | 7/2008 |
| WO | 2008/141817 | 11/2008 |
| WO | 2011/111730 A1 | 9/2011 |

* cited by examiner

WEAR-MONITORING OF A GEARBOX IN A POWER STATION

FIELD OF THE INVENTION

The present invention relates generally to a method of monitoring a wear of a gearbox in a power station and to a gearbox monitoring device.

BACKGROUND

Wind power plants—also referred to as windmills—are a promising source of renewable energy, which is already available on the market. Multiple windmills are often clustered in wind parks or wind farms located in windy areas. The classic design comprises a tower with a horizontally revolvable nacelle at the top, where a rotor with propeller-blades is arranged and where also an electrical generator is located.

In windmill applications, gearboxes are required to translate the rotor-blade rotation at an operational speed of approximately 6 to 20 revolutions per minute (RPM) to the electrical generator which runs in a range of approximately 900 to 2000 RPM. As spur gears in general allow a gear ratio of up to about 1:5 per stage, multiple gear stages are required to achieve the required ratio of gearing. To reduce the number of stages and gearwheels and also because of efficiency, size, noise and cost considerations, wind power stages can alternatively be equipped with at least one planetary gear stage having a higher gear rate. Also combinations of planetary and spur stages are used.

Wind power stations often operate in the Megawatt range and are designed for a lifecycle of about 20 years or more. Although the efficiency of such a gearbox is quite high (e.g. about 98%), in view of the Megawatts of power transmitted, the gearbox itself or the oil inside of it has to be actively cooled in many cases. The long lifetime also means hundreds of millions of rotor revolutions and billions of revolutions of the generator. Analogous applications are also gearboxes in other slow running power stations with slowly rotating input shafts which require a gearing up, like waterwheels, tidal power plants, etc. having similar operating conditions than the above mentioned windmills. In addition to the quite long lifetime, the load of such a windmill can vary in a wide range and rapidly, in particular in case of an emergency stop or a flurry, squall or gust of wind. A load control can be achieved by varying the angle of attack of the blades or by a horizontal rotation of the whole nacelle, but those adjustments are slow compared to the possible changes in wind speed. Also, the environmental and climatic conditions in the nacelle are not favourable for running machinery. The above facts show that a windmill-gearbox will require servicing during runtime.

There are quite sophisticated methods for determining the expectable runtime of a gearbox during the design phase. Those calculations are based on the expected loads and on statistical data and experiences. Due to the uncertainties of the actual load profiles during runtime, manufacturing tolerances and often harsh environmental conditions, those calculations can only be used for determining a preventive maintenances schedule comprising a considerable safety margin. Certain unexpected impacts during runtime, such as peak loads, temperature cycles, manufacturing inaccuracy etc. can cause an early failure which—if not detected in advance—can lead to unexpected gearbox failure like jamming or spinning and all the side effects which might result therefrom.

In windmills, the gearbox is usually placed in the nacelle, high above ground level, and therefore it is a difficult task to maintain or repair the gearbox or parts of it. It is burdensome to access it, in particular as windmills are often sited in remote areas, on mountains or even offshore. In many cases, a helicopter is required to supply the nacelle with spare parts.

In particular, as maintenance and replacement of gearboxes can be quite cost-intense, it is a desire to schedule repairs and/or replacements based on a determined actual condition of the gearbox rather than precautionary do those tasks, often well in advance of the end of the actual lifespan.

A known method to estimate the condition of a gearbox is to analyze the oil inside the gearbox for abrasion, in particular for grazed metal particles. Beside cyclical manual analysis, there are also in-line sensors known. For example, the device presented in KR 2007024230 will provide condition signal and a warning, if the result of the oil-analysis—as indication for worn gearwheels—is critical.

Another method—which also has been done manually by skilled craftsman for ages—is to "listen" to the sound emitted by the gearbox. In automated systems, this can be done by means of acoustic analysis by a kind of microphone or by means of vibrations or acceleration sensors. The publications US 2008/0234964, CN 101 196 174 or U.S. Pat. No. 5,661,659 refer to wear detection systems for mechanical systems like gearboxes by a structural sound or vibration analysis. The publication US 2007/0118333 discloses an abnormality diagnosis system, wherein the acoustic sensors for detecting an abnormality in the gearbox sounds are comprised in a bearing unit.

In WO 2004/034010 a method for quality surveillance in manufacturing gearboxes is presented. This is achieved by monitoring two interacting cogwheels by two synchronously sampled rotary transducers attached to the gearwheel shafts after assembly of the gearbox. Therein, the backlash of the gearing is determined by measurements in a forward and backward mode which gives an indication of the quality of the gearbox.

In U.S. Pat. No. 6,175,793 a vehicle's steering-wheel-gearbox is monitored by a similar angular position sensing means at the input and output shafts of the gearbox and also by a torque sensing unit. By a mathematical cancellation of the torque related torsions, a signal representative of the wear of the gearwheels in the gearbox is generated.

JP 58 034333 relates to a invariably monitoring of stress conditions at a diaphragm coupling on the basis of the extent of axial displacement, the rotational speed and load of a power plant. This is done by a means for detecting the extent of axial displacement near the fitting part of the diaphragm coupling to a generator shaft. On the basis of the displacement, the rotational speed and load of a power plant, stresses at the diaphragm coupling are calculated and safe operation state of the coupling is judged.

Although some wear effects can be concluded from the rotational position data, the wear information comprised in the rotational data is incomplete and the evaluation of those data is based on experience. The play or backlash of the tooth of the gearwheels can quite accurately be estimated, but many wear effects in a gearbox can not be concluded from rotational position offsets only. If only angular measurements are analyzed, wear which primarily manifests itself in other effects, not visible in the angular position, is undetectable.

A more reliable basis for determining the condition of a gearbox is therefore desirable. The above mentioned noise measurement can cover a wider range of wear effects, but it is in general not highly accurate and also comprises guesswork and a setup-specific configuration which is different for each instance of gearbox. Also, the desired management of the whole system, comprising an accurate load monitoring and taking into account dependencies from the actual load conditions and a lifespan- or lifetime-management of critical system parts is not feasible by acoustic analysis only. In particular, in big and difficult to access machineries like the ones in windmill towers, false detections are a big cost issue, no matter if false positive or false negative detections are made. In many critical applications, acoustic analysis on its own is not reliable and accurate enough for a stand-alone use.

SUMMARY

It is an object of the present invention to provide an improved lifetime management of a wind power station by accurate and reliable wear monitoring of the gearbox, as one of the most lifespan-critical parts.

It is therefore an object of the present invention to more reliably monitor a gearbox of a windmill system.

A further object of the present invention is to provide an improved method and system for monitoring the wear of the whole gearbox during runtime, in particular comprising the whole setup—with gearwheels, shafts and bearings—in the monitoring.

Another object of the present invention is to allow a more accurate determination of the kind and location of a worn part in the gearbox, in particular providing a condition-state datum for all or at least the most critical components of the gearbox.

It is also an object of the present invention to cover a wide spectral range of wear indications in the monitoring, in particular also low frequency ranges, starting form DC level.

The present invention relates to a method of monitoring the wear of a gearbox in a wind power station. The gearbox comprises at least one first shaft, at least one second shaft, cogwheels and bearings as components of the gearbox.

The method comprises sensing a first angular position—as a first degree of freedom—at the first shaft by a first rotational shaft encoder, sensing a second angular position at the second shaft by a second rotational shaft encoder. Monitoring the wear of the gearbox is done according to differences of the sensed angular positions of the shafts and a condition-signal representative of the wear of the transmission-unit according to the monitored differences is generated.

The method further involves an additional sensing of at least one additional degree of freedom, in particular an axial and/or eccentric displacement, of at least one of the shafts, in particular caused by wear of at least one of the components of the gearbox, and monitoring the additional degree of freedom as an indication of wear and generating the condition-signal according to the displacement and the differences in at least two degrees of freedom, in particular in at least one angular and at least one linear degree of freedom.

By analyzing the rotational position of the input and output shaft of the gearbox and comparing those measurements, an indication of the wear in the form of backlash or play as well as teeth abrasion or break can be evaluated. Play or backlash especially occurs when shifting the direction of the rotation. Signal disturbances due to tooth-errors have a rotational periodicity. If the error does not occur on a measured shaft, but for example on an intermediate stage gearwheel, it is scaled by the gear transmission ratio.

In particular, if the torque-load of the gearbox is also measured and the torque related angular displacement effects are compensated, the above mentioned wear effects are represented by the angular displacement differences of the shafts relative to each other. By incorporation of the knowledge of the materials and shapes of the internal components, the gearbox's theoretical behaviour under load and dynamics can be predicted and the dynamic performance of the gearbox or certain parts of it can be derived and monitored.

Two angular encoders on a single shaft—with a torque loaded shaft section in-between and in knowledge of the stiffness of the shaft—can be used to determine the torque according to the angular twist or torsion of the shaft under load. Thereby, things like peak torque, how many times the torque has exceeded a certain limit, number of load cycles, etc. can be recorded, evaluated and monitored. This can be done individually for one or multiple axis. By the angular position measurement, the axis's rotational speed is also known, and by torque and velocity, the transmitted power can be calculated. If the power on the input and output shaft is determined, the efficiency of the gearbox—or by two encoders on each axis, even the efficiency of each of the internal stages—can be calculated. Fluctuations on the torsion of a shaft within one revolution can also be an indication of wear. A well running gear will have a smooth, round angular torque distribution, without peaks or singularities. Another source for measuring the actual power and/or torque value can be the electrical output of the generator.

The encoders can be absolute or relative encoders. For a determination in a long term manner, absolute angular encoders can be used. By this, even in case of non-continuous monitoring or power failure, the offsets of the measured position values are constant relative to each other. By analyzing variations in the offsets of at least two absolute encoders located at different shafts, a variation in the gearing inside of the system can be evaluated, which is an indication of wear, in particular if torque yielding and temperature influences are also measured and mathematically compensated.

By determining the absolute angular positions relative to the box fundament, either by using absolute encoders or encoders with a precise reference mark at least once a turn, also additional scenarios can be covered. For example, a first revolution of the gears measures an angular profile reference as reference data, in particular with and without load and in both directions of rotation. The reference data can then be used for determining wear or singular effects. Also, in case of a required repair on site, like a broken or heavily worn tooth which requires material to be applied (e.g. by welding, etc.), the reference data can be used to re-establish the reference condition (e.g. by a dedicated grinding of non optimal shaped teeth). Thereby, a smooth angular position profile can be established, without peaks, which would indicate a non optimal meshing of the gearwheels, by in particular reworking the effected sections of the cogwheel.

Besides the above mentioned modelling of a single shaft, the stiffness of the overall gearbox can also be calculated or experimentally evaluated e.g. in a running in phase. The theoretical, experimental and actual system behaviour can be compared, wherein the resulting differences are representative of the condition of the gearbox and the information gathered thereby can also be used for managing its lifespan.

In practical use, not only a wear indication of the overall gearbox—such as detectable by structural sound or an input and output encoder only—is of interest, but also where, at which stage or which part of the gearbox the wear problem occurs. A smart arrangement of sensors at many, all, or at least at the most critical system components or their respective shafts, can be used to monitor the whole gearbox precisely. The monitoring of the gearwheels can be done down to the level of monitoring a single tooth to determine its condition.

According to the present invention, determining the shaft movement in multiple degrees of freedom, in particular in an additional axial and eccentric direction, can gain additional information of the gearbox's condition and a more accurate monitoring can be achieved.

On one hand, this can be done by extending the system by combining angular encoders with other axis-sensor-means for example optical, capacitive or inductive displacement sensors.

Another approach is the use of an encoder which is built to also determine eccentricities and axial shifts. The encoder can be embodied as a capacitive encoder, an optical rotation encoder, magnetic encoder, or other type of encoder with the capability of measuring the angular position and at least one additional degree of freedom. For example, an optical angular encoder with a line sensor or an area sensor for the evaluation of an optical projection of an arbitrary geometrical 2D-pattern can be used, wherein the projected pattern can even be non-radial. Such sensors, evaluation circuitries and the evaluation-software are optimized for determining changes in location and/or scale of the projection. In case of a radial disk comprising a 2D-pattern and a projection in axial direction, a change in location represents an eccentricity, a change in scale represents an axial shift and a pattern evaluation determines the angular position.

Known sensors in the prior art, which are capable of detecting such effects, are not foreseen for a measurement of the effect itself, but rather to achieve a compensation for a highly accurate angular measurement. The values of the axial and eccentric side effects are not even available at the sensors output in prior art, as they are only used internally for angular measurement correction purposes. Even if such information would be available at a distinct output, it is not obvious to use the latter to monitor different wear effects of a gearbox as it is done according to the present invention.

Exemplary embodiments of sensors or the underlying principles for determining additional degrees of freedom can for example be found in WO 2008/083797, WO 2008/141817, WO 2007/051575 or EP 1 632 754.

Bearing failures and bearing wear can also be detected according to the present invention, as those problems manifest mainly in eccentricity or axial loosening. In particular, when helical cut cogwheels are used, axial forces are present. In many cases, the bearings are pre-tensioned and if they loosen over time, this can be an indication of wear. Especially, once the bearings are loosened, an increase of abrasion will occur. If undetected, this can lead to a complete system failure, but if detected and re-stressed, such can be avoided and the overall lifetime can be increased without exchange and with low maintenance effort.

In addition, it is possible to detect shaft-failures like plastic deformations due to overload conditions, which can also result in eccentric or axial displacements. If the gearbox is kept in operation with such a deformed part inside, after-effects will occur, whereby not only the primary affected part, but also other parts will require maintenance or replacement.

Especially for slowly rotating gearboxes, a wear monitoring by encoders can be advantageous over a wear monitoring by sound or vibration only, as many error terms to be determined are—due to the slow rotation speed—of low frequency. As sound and vibration analysis is advantageous for higher frequencies, a combination of both wear monitoring principles covers a wide spectral range, which is in particular advantageous if slow and fast rotations have to be covered.

Also, an accurate monitoring of the actual load-cycles improves the certainty of a lifespan estimation. For example, a gearbox running at low loads, well below the values it was designed for, will achieve an extended lifetime. On the other side, unexpected, harsh impacts can dramatically reduce the remaining lifetime below the expected value. An undetected, slight deformation of an internal part due to a short time overload condition, can result in increased wear, and also affect other components of the gearbox. As a result, even a complete replacement of the whole gearbox will be required. By a simple mending of the slight deformation at first hand, such would have been avoidable.

Another example which results in reduced lifetime is an unbalance at one of the shafts. This can also be detected according to the present invention, as it is observable by eccentricity effects, in particular by frequency or speed dependent eccentricities.

BRIEF DESCRIPTION OF THE DRAWINGS

The method, the devices and setup according to the invention are described or explained in more detail below, purely by way of example, with reference to working examples shown schematically in the drawings. Specifically.

The diagrams of the figures should not be considered as being drawn to scale.

DETAILED DESCRIPTION

Figure 1:
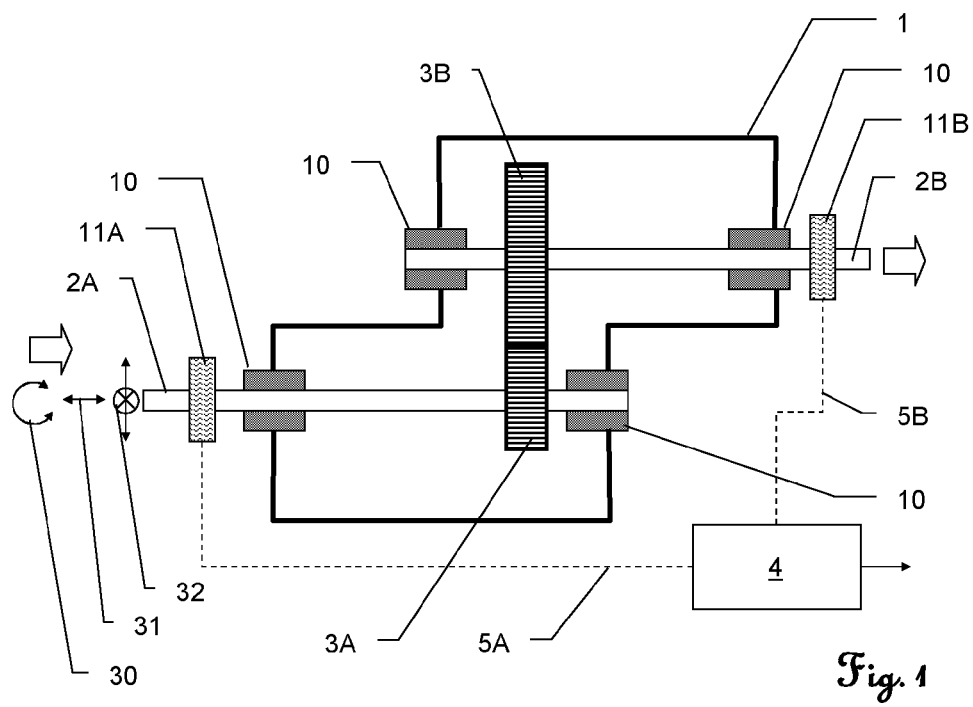
FIG. 1 shows an example of a first embodiment of a gearbox with a single stage for illustration of the method according to the invention.

FIG. 1 illustrates an exemplary embodiment of a single stage gearbox 1 with two shafts, an input shaft 2A and an output shaft 2B. Apparently, the gearbox 1 can also be used in a reverse direction by changing the roles of the shafts 2A and 2B. The shafts 2A and 2B are supported by bearings 10. The bearings 10 can for example be gliding bearings, roller bearings, air or fluid bearings, magnetic bearings, etc. As this embodiment shows a single stage gearbox 1, there are two interacting gears 3A and 3B, an input gear 3A and an output gear 3B comprised within the gearbox 1. The gearbox 1 can be greased or filled with lubricant such as oil, in particular for the reduction of friction, or a forced lubrication system can be applied which can also cover cooling purposes.

As a transformation of the speed/momentum ratio is the common purpose of a gearbox 1, the gears 3A and 3B have different diameters and numbers of teeth to achieve the desired gear and transmission ratio, but also a lateral or angular shift of the output 2B relative to the input shaft 2A or a change in rolling direction can be the purpose of a gearbox 1.

According to the invention, there are at least two sensors 11A and 11B attached to the gearbox 1. As described above, both of the sensors are capable of detecting the angular position 30 of the shaft 2A relative to the gearbox's base 1 as a first degree of freedom. At least one of the sensors 11A, 11B or an additional sensor is capable of detecting axial 31 or eccentric 32 displacements. In FIG. 1 the sensors 11A and 11B are both capable of detecting three degrees of freedom, one rotational 30 around the axis, one axially 31 and one eccentric 32. A skilled person is aware of the fact that an eccentric 32 error itself can be interpreted as a Cartesian displacement in two dimensions, resulting in an total of four dimensions, three linear and one rotational. Alternatively, an eccentric 32 error can be interpreted as a polar displacement by rotation angle and radius, and as the rotations degree of freedom is covered, only one additional degree of freedom in the form of the radius has to be covered, resulting in a total of three values, one rotational and two linear.

For a measurement of displacements due to wear, other effects like temperature strain or mechanical strain can be cancelled out mathematically by measurement of the causing effects like temperature or torque and modelling and subtracting the displacements resulting thereof.

A torque measurement can be done by dedicated means, according to the generator's electrical output or by measuring a shaft's torsion by the angular information from the sensors 2A and 2B. By an angular measurement at two ends of one (or more) torque loaded shaft sections, the differences of the measurements, as a twist of the shaft, will be proportional to the torque, in particular once backlash and other effects are cancelled out. By knowing the torque and rotational speed, which can be determined by the angular encoders, also the transmitted power can be calculated.

Angular displacements in a gearbox are good indicators for detecting torsion of the gears and the shafts and also for determining the backlash. A certain backlash is a necessity for a functioning gear transmission, but too much or too little play is disadvantageous and an indication of a putative reduction of lifetime. Also, a complete failure or at least a partial break off of one or more teeth of a gearwheel is identifiable by an increased backlash, which occurs with a rotational periodicity, each time when the affected section of the gearwheel is in interaction.

The actual forces and load conditions inside a gearbox 1 are quite complex. For example, the forces of a gear-gear combination in general comprise an axial component—shifting the gears sideways (in particular for helical cut gears), a radial component—forcing the two cogwheels apart and a tangential component—which transmits the actual momentum. Furthermore, some friction forces are also unavoidable. Those forces all burden the gearwheels 3A 3B, the bearings 10, the shafts 2A 2B and the housing of the gearbox 1 to achieve force equilibrium.

The angular-only diagnosis of prior art is per se not capable of detecting axial 31 or radial 32 effects. For example, the radial and tangential forces and—due to the radius of the gearwheel—also the axial forces result in bending moments applied to the shafts and also lateral and longitudinal forces at the bearings 10. The bending moments result in an eccentricity 32 of the shaft 2A compared to the theoretical force-free shaft axis. The lateral forces also burden and displace the bearings 10 in axial direction 31.

The effects of those forces are also relevant for the condition of a gearbox 1 and influence or indicate the wear of the gearbox 1, nevertheless those are not detectable and evaluable by rotational only encoders. By analyzing all the forces or rather the effects resulting therefrom according to the present invention, a more accurate analysis of friction, deformation, play, losses and other effects is achieved.

Also, the bearings 10 can be monitored according to the invention, as they are also subject to wear, sometimes even more than the gearwheels 3A 3B. In most cases, bearing-wear does not result in increased play or backlash of the gearwheels 3A 3B, but rather in eccentricity or axial play, which is undetectable by a rotational only encoder.

The figure also shows the measured signals from the sensors 5A and 5B and the evaluation unit 4. To determine the difference of angular position at the same time, the readout of the sensors 11A and 11B is, preferably, synchronized. The evaluation unit generates a signal representative of the wear of the gearbox 1 based on the sensed position and displacement information from the sensors 11A and 11B.

Figure 2:
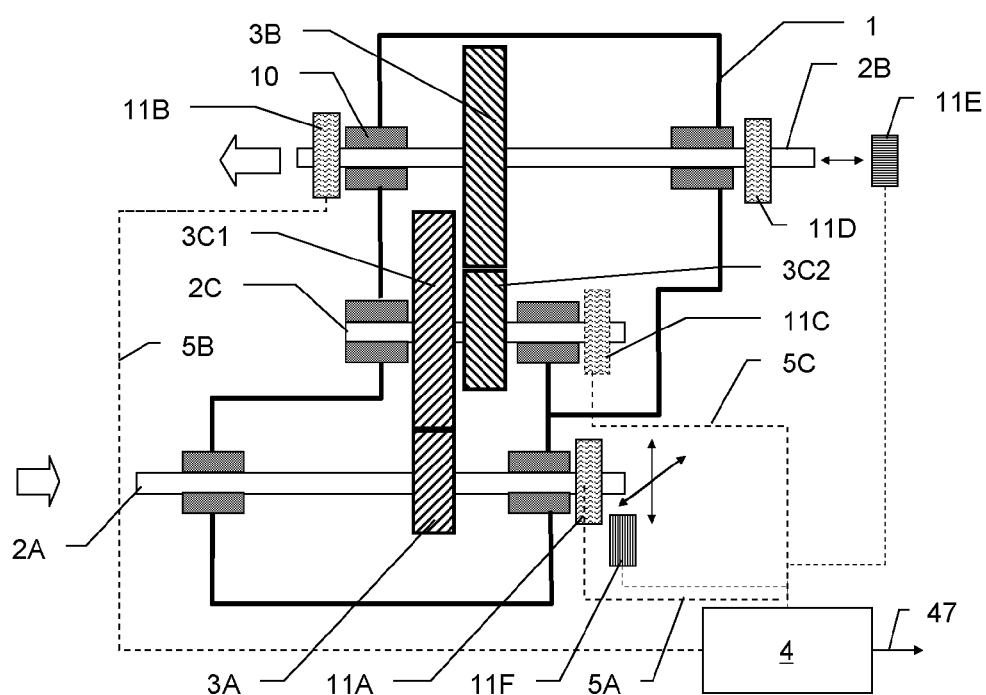
FIG. 2 shows an example of a second embodiment of a gearbox with multiple stages and an alternative sensor setup according to the invention.

FIG. 2 illustrates a multi stage gearbox 1. The gearbox 1 comprises at least one input-shaft 2A were a driving torque or momentum is applied and at least one output-shaft 2B where a driving torque is drawn off, with a changed torque/speed ratio according to the tooth ratio. In between the two shafts 2A, 2B, there are a plurality of gears 3A, 3B, 3C1, 3C2, in this particular example one further intermediate-stage-shaft 3C equipped with two cogwheels 3C1, 3C2. Such multi stage gearboxes can be seen as a daisy chain of single stages, wherein the input shaft of one stage merges with output shaft of the previous stage resulting in an intermediate stage, which can also be inaccessible and invisible from the outside of the gearbox.

The gears are attached to a centric shaft, either rotatable about the shaft by some bearing or coupled to the shaft for the transmission of torque from the gear to the shaft. There are also special gear arrangements known, such as sprockets, worm wheels, spur wheels, planetary wheel drives, etc. which can have a more complex mechanic than simple spur wheels.

There are also different shapes and arrangements of teeth known for the gears. For example, helical cut gears can achieve more running smoothness and are known to produce less noise in comparison to orthogonally toothed gears, but with the side effect of additional axial forces on the shaft and bearings. In the gears, the teeth are a critical part, as they have to transmit the torque from one wheel to the other. Dependent on the actual shape and accuracy of the shape of the teeth, high punctual loads can occur on the face of the teeth. Furthermore, some friction between two interacting teeth will happen. Although friction can theoretically be avoided by design and be replaced by a rolling motion only, practically at least some friction will always remain due to production tolerances, mounting inaccuracies, thermal expansion, etc. Also, the cyclic changes in the load profile of the teeth can raise fatigue issues and failure.

The load on the teeth of a gearbox 1 will lead to a wear in the gearbox 1 which can result in damage of a gearbox 1. Both kinds of total failure, jamming or spinning of the gearbox 1 can also result in severe follow-up damages. The tooth-wear, in particular if undetected, will even increase friction and scuffing, generate more heat, and even lead to a following tooth failure like a cracking, breaking loose or even breaking out of one or more teeth. In particular, in case of a failure of one tooth, the gearbox will remain working, but with an increased load on the other teeth, whereby those will likely fail as well within a short timeframe. A splintered part of a tooth can also cause jamming if it gets squeezed in between two gearwheels.

In particular heavy machinery, such as wind power plants, which have to transmit high forces, require corresponding large gears and gearboxes, which are costly and hard to inspect and maintain. Also, the whole machinery has to be halted for error diagnosis and maintenance, resulting in productivity losses.

An almost torque-independent measurement of the sensors can be achieved by a placement of the sensor on an unloaded end of the shaft as illustrated by the sensors 11C and 11D. As the gearwheels 3B and 3C2 themselves have high torsion stiffness due to their geometry, the unloaded ends of the shafts will rotate in conformance with the gearwheel, almost independent of torsional effects by the actual power transmitted by the gearbox.

The sensor 11D is an example of an embodiment which uses a dedicated linear position sensor in the axial degree of freedom, indicated by the double-arrow at the sensor 11E. Sensor 11A has an accompanied eccentric sensor 11F indicated by the two degrees of freedom shown next to the sensor 11F, which measures the same shaft as the sensor 11A. As mentioned, eccentricity can also be indicated in polar coordinates by angle and radius. As the angular position is already measured, only the radius has to be determined, which can e.g. be done by a radial distance sensing of the circumference of the shaft in one additional (linear) degree of freedom.

In the shown embodiment, there is also a sensor 11C at the internal-stage-shaft 2C. Thereby all the shafts in the gearbox 1 can be monitored and each gearing stage can be evaluated separately. For example, if the intermediate shaft 2C and/or its gearwheel 3C2 is known or expected to be the weakest link in the gearbox, such a direct measurement is advantageous. In particular, the shown sensor 11C is even located inside of the gearbox 1.

In further embodiments, other or more axis of the gearbox 1 could be equipped with sensors for an individual subset of degrees of freedom. For example, in an exhaustive embodiment, each end of each shaft can be equipped with a sensor capable of sensing the rotational, axial and eccentric degree of freedom.

Figure 3A:
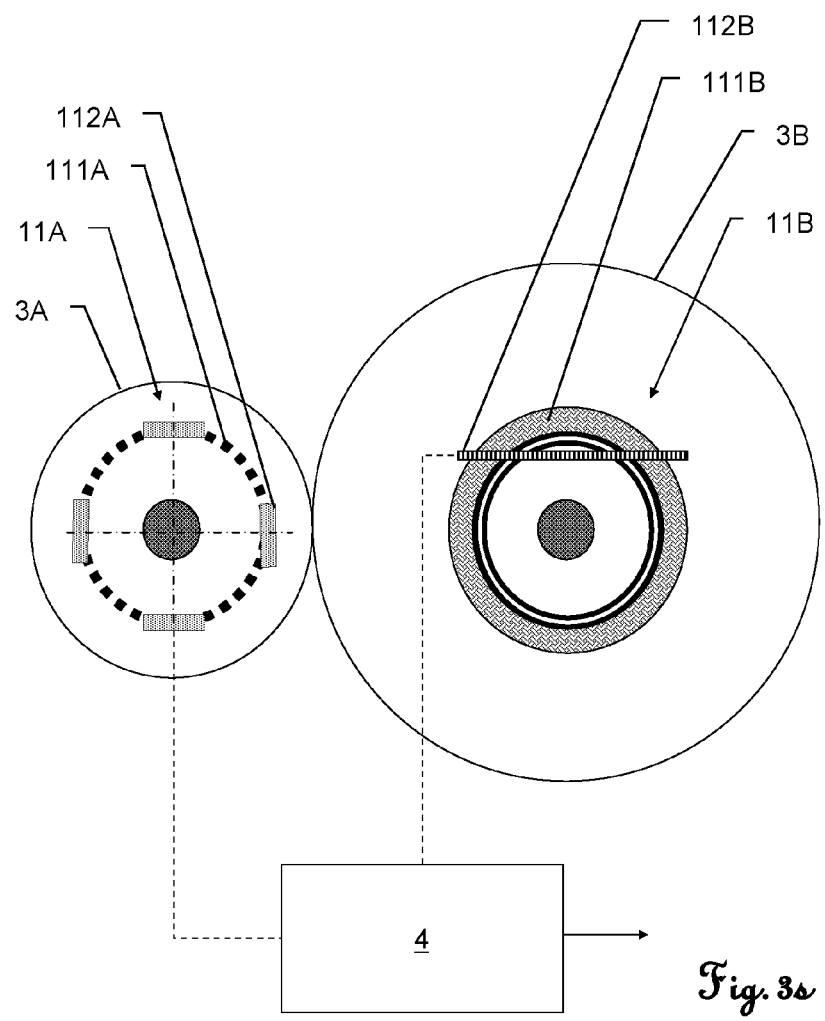
FIG. 3a shows abstracted gearings with exemplary embodiments of sensors which can be used according to the invention.

FIG. 3a illustrates a close-up of a gear system with two cogwheels 3A and 3B (teeth not shown) with exemplary embodiments of sensors for a measurement in more than the rotational degree of freedom. Sensor 11A comprises a code-wheel 111A and four sensors 112A which are arranged at the circumference of the code wheel. The sensors' arrangement allows a determination of the eccentricity of the code wheel, while the sensors are built in such a way as to determine the axial position according to a scale factor for the code wheels' projection.

Sensor 11B comprises a single line sensor 112B and a code wheel 111B carrying the code for rotational position determination and also two inner rings for eccentricity and axial position determination by evaluating the scaling and displacement of the projection of the rings.

There is a variety of other sensor designs capable of measuring the rotational position and an additional linear displacement or a tilt. For example the European patent application Nr. 10157931.6 relates to a measurement of multiple degrees of freedom by one single device. Besides those off-centre sensing principles, there are also central sensing encoders known, like in DE 197 50 474, EP 1 890 113 or DE 39 24 460, which are measuring directly to a shaft's plain end and can also be used according to the present invention.

The one single sensor for determining at least two degrees of freedom comprises a code carrier 111A, 111B and a sensor arrangement 112A, 112B, code carrier and sensor arrangement being rotatable relative to each other about an axis of the shaft as a first degree of freedom. The sensing comprises a generation of a code projection, dependent on the three-dimensional displacement of the code carrier (11A, 111B) relative to the sensor arrangement (112A,112B), onto the sensor arrangement (112A,112B) and detection of at least a part of the code projection. From the code projection, the angular position of the code carrier (111A,11B), based on the axis of the shaft is determined.

Also a displacement value for the at least one additional degree of freedom of the code carrier (111A,111B) relative to the sensor arrangement (112A,112B) is determined on the basis of the code projection, in particular wherein an axial displacement of the sensor arrangement relative to the code carrier and/or the eccentricity of the sensor arrangement relative to the code carrier is determined.

Figure 3B:
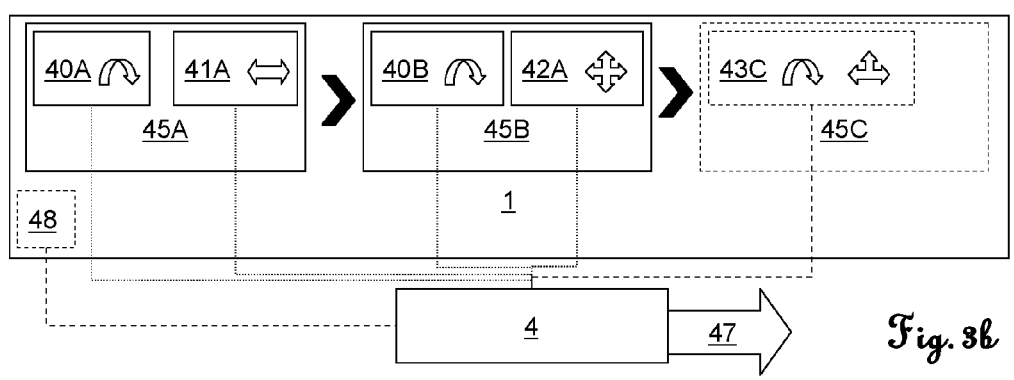
FIG. 3b shows abstracted block diagram for illustrating the method according to the invention.

FIG. 3B shows a block diagram of the method of monitoring a gearbox 1 which comprises multiple stages 45A, 45B,45C, having at least one corresponding shaft 2A,2B,2C and being in mechanical interaction with each other. The stages 45A,45B,46C are equipped with sensor means, which can be of different types. As possible examples, angular transducers 40A and 40B, axial shift sensor 41A, eccentricity sensor 42B and a combined angular, axial and eccentric sensor 43C is illustrated. The calculation unit 4 for monitoring the gearbox 1 is determining a condition signal 47 from the sensor data, which can comprise a single information or information dedicated to a certain component, stage or subset of the gearbox 1.

As mentioned above, a sound/vibration analysis can quite well cover higher frequency ranges, whereby a combination of both wear monitoring principles can be used to cover a wide spectral range. Especially, if slow and fast rotations are present, a combination of positional and sound monitoring can be advantageous. For example, in an embodiment according to the present invention for a windmill or waterwheel gearbox, the input stage—rotating slowly at about 10 RPM—can be monitored by an angular sensing 45A,45B, 45C, whereas the output stage—rotating fast at about 2000 RPM—can be covered by sound and/or vibration monitoring 48—in addition or as an alternative to the positional sensing. According to the present invention, also the low frequency wear effects can be monitored, which are not well coverable by sound analysis or are often overlaid by external noise and vibration sources, like a swinging of the whole windmill tower, etc.

Figure 4:
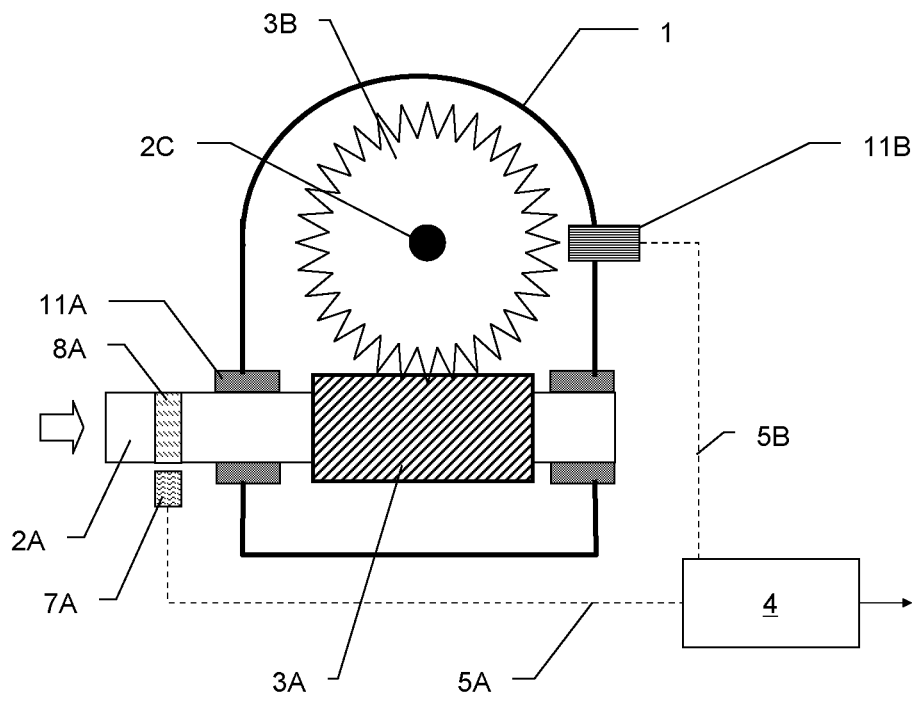
FIG. 4 shows a special embodiment of a gearbox and other examples of sensors which can be used by the method according to the invention.

FIG. 4 illustrates a special embodiment of a worm gear, where the shaft 2A is in particular axially loaded, due to the design of the tooth system 3A.

The sensor 7A and the corresponding code-section 8A on the input shaft 2A is embodied with a code on shaft 8A. The code 8A can for example be (laser) engraved, etched, printed, glued onto the shaft, and the readhead 7A is positioned to sense at least part of the code 8A to determine the angular position. By sensing the distance between the shaft and the sensor, also the eccentricity can be determined for example optically or capacitively. The code 8A and the readhead 7A can further determine the position in axial direction, which information is also evaluated, not only to determine the wear of the gearing but also of the bearings which have to sustain the axial load. Such a system can also be used for a quick retrofitting, as the shaft has only to be stopped for applying the code 8A.

In this embodiment, the second sensor 11B is built as a tooth sensor which is directly sensing the teeth of the cogwheel 3B. For example, this can be done capacitively or magnetically by a distance evaluation between the sensor and the tooth. A rotating cogwheel will result in a signal with an alternating part representing the teeth and the angular position and an offset, which can for example have a periodicity of one revolution due to eccentricity. Apparently, the above mentioned sensor principles are not limited to worm gears but can also be applied to other gearbox types.

Figure 5:
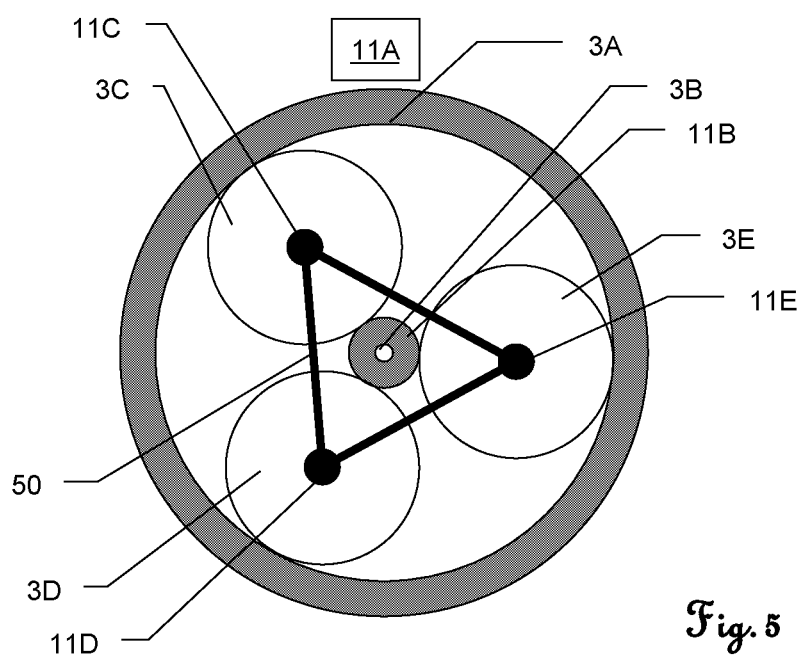
FIG. 5 shows a planetary stage of a gearbox to explain the applicability of the method according to the invention.

FIG. 5 illustrates an embodiment of planetary gear stage. In one embodiment, planetary gears have a rotating outer ring 3A and a standstill planet carrier 50—to which the planetary wheels 3C, 3D, 3E are attached. Another embodiment is realized by a fixed outer ring 3A and a revolving planet carrier 50. The placements of the sensors vary accordingly, as it is preferred to arrange the sensors on the non-rotating components for ease of electrical connection and readout, although rotating sensors connected rotationally or by wireless means can be used otherwise.

In the shown example, the planet carrier 50 is static, wherefore the planetary wheels 3C, 3D, 3E can be sensed by three sensors 11C, 11D, 11E. Also, the input- and output-shafts or wheels 3A and 3B can be sensed by the sensors 11A and 11B. Thereby the whole gear can be monitored, although planetary gears are known to be difficult to monitor by acoustic means.

When the planet carrier is rotating, a sensing of the planetary wheels would require a revolvable electrical connection or some wireless means, but at least the rotation of the whole carrier can be sensed, which will suffer from eccentricity if a planetary wheel is damaged.

Figure 6:
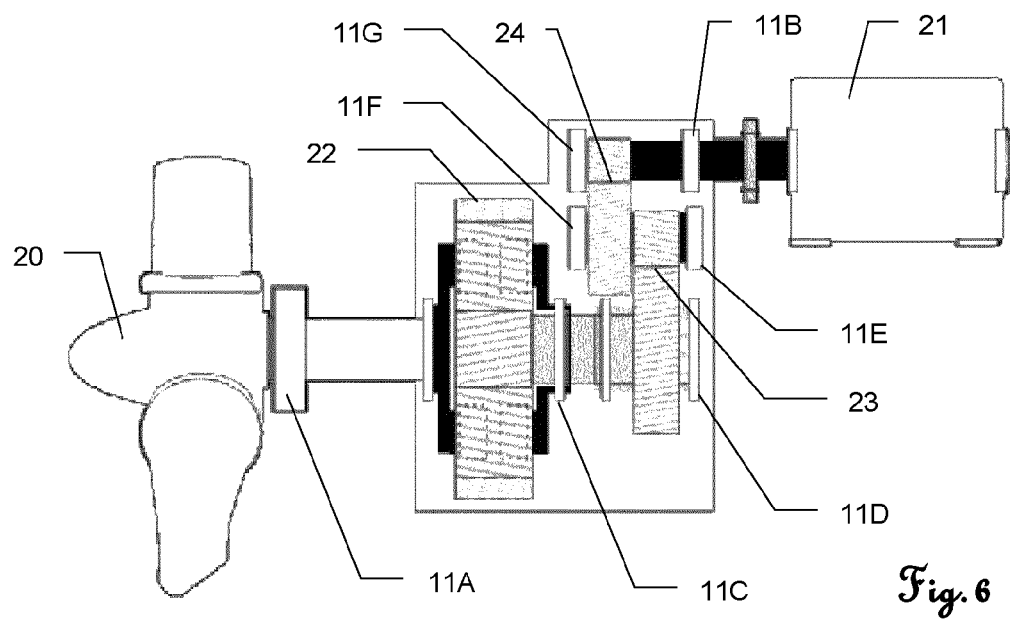
FIG. 6 shows an embodiment of a transmission system of a windmill with sensors for the method according to the invention.

FIG. 6 illustrates another embodiment of a mechanical transmission system of a wind power plant with a rotor 20, a gearbox 1 and a generator 21. The gearbox 1 comprises multiple, in particular three stages, whereof the first is a planetary stage 22 and the others comprise helical cut cogwheel stages 23, 24. According to the invention, the shafts of the axis are equipped with sensors 11A to 11G, of which at least one, preferably all, are capable of sensing rotation and at least one additional degree of freedom, in particular an axial and/or eccentric shift.

Figure 7:
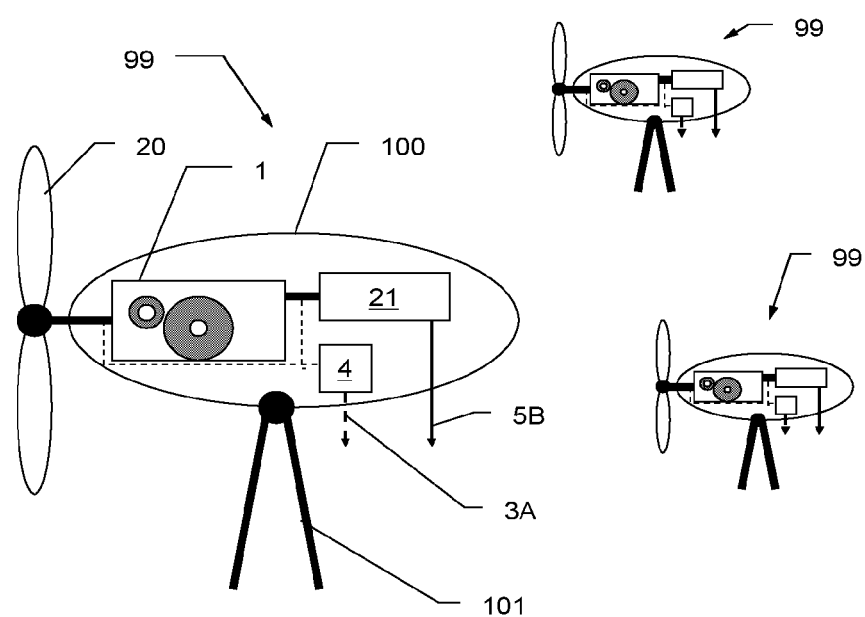
FIG. 7 shows an illustration of a wind farm which is monitored and managed according to the present invention.

FIG. 7 illustrates a schematic of a wind power plant farm with a plurality of windmills 99 each having a rotor 20 connected to a gearbox 1. On the other end of the gearbox 1, there is an electrical generator 21. All those parts are inside of a nacelle 100 on a tower 101. The gearbox 1 is equipped with a monitoring device 4 according to the invention for monitoring the wear of the gearbox and lifetime management.

The monitoring device 4 allows an accurate monitoring or the wear condition of each windmill 99. By the resulting data, not only the health of the whole windmill 99 can be determined, but also a diagnosis down to the, in particular critical, component level can be done. One example of the advantages of the present invention is that by knowing the required spare parts even before opening the gearbox, the required parts can be sourced in advance of maintenance. Also, statistical analysis like failure trending can be done at a very accurate level.

Not only a schedule of servicing can be planned based on those data, but also a planning of further load distributions between the windmills in the wind park can be planned to achieve an equalization of service intervals between multiple windmills, allowing to maintain multiple windmills in the same timeframe and not randomly upon the present demand.

As a load reduction on a half worn gearbox can prolong its lifetime to a certain extent the servicing can be scheduled to a desired timeframe, e.g. calm season according to the weather forecast, but still producing energy (although with a slightly reduced efficiency).

What is claimed is:

1. A gearbox monitoring device for a power station gearbox, the gearbox monitoring device comprising:
   a first angular shaft encoder for a first-shaft of the power station gearbox, which angular shaft encoder is configured to sense a first angular position signal,
   at least a second angular shaft encoder for at least a second-shaft of the power station gearbox, which angular shaft encoder is configured to sense at least a second angular position signal,
   at least one displacement sensor for sensing displacements of a shaft of the gearbox in at least one translational degree of freedom, and
   a calculation unit configured to monitor a wear-condition of the gearbox according to the angular position signals of the angular shaft encoders and at least one translational displacement signal from the at least one displacement sensor, and provide a condition-signal representative of the wear-condition of the gearbox,
   wherein:
   the first and/or second shaft has a further angular shaft encoder and a twist of the shaft is determined by the calculation unit according to the difference in relative angular positions of the angular shaft encoders; and
   a torque load signal is generated by the calculation unit according to the twist and the shaft's stiffness.

2. The device according to claim 1, wherein the calculation unit for monitoring a wear-condition of the gearbox according to angular position signals of the angular shaft encoders does so by determining the difference of the angular position signals of the at least two angular shaft encoders.

3. The device according to claim 1, wherein the at least one translational degree of freedom comprises an axial or eccentric degree of freedom.

4. The device according to claim 1, wherein one of the angular shaft encoders and the displacement sensor are embodied as a single sensor, which is configured to sense at least two degrees of freedom.

5. The device according to claim 4, wherein the wear-condition of the gearbox is determined according to the angular position signal and at least one axial position signal and/or eccentric position signal from the single sensor.

6. The device according to claim 4, further comprising a torque sensing unit for determining a torque-load signal of the gearbox and/or a synchronisation unit for capturing the signals at a distinct time.

7. The device according to claim 1, wherein an intermediate-stage-shaft of the gearbox is equipped with a sensor.

8. The device according to claim 7, wherein all shafts are equipped with at least one sensor.

9. The device according to claim 1, wherein the power station includes a wind-, waterwheel- or tidal-power plant.

10. The device according to claim 1, wherein the angular shaft encoder comprises a code carrier and a sensor arrangement, code carrier and sensor arrangement being rotatable relative to each other; and wherein a code projection onto the sensor arrangement and detection of at least a part of the code projection is established; and the angular position of the code carrier is determined from the code projection.

11. A wear monitored gearbox system comprising:
a power station gearbox comprising a first shaft and a second shaft;
a gearbox monitoring device for the power station gearbox, the gearbox monitoring device comprising:
a first angular shaft encoder for the first-shaft of the power station gearbox, which angular shaft encoder is configured to sense a first angular position signal,
at least a second angular shaft encoder for the at least second-shaft of the power station gearbox, which angular shaft encoder is configured to sense at least a second angular position signal,
at least one displacement sensor for sensing displacements of a shaft of the gearbox in at least one translational degree of freedom, and
a calculation unit configured to monitor a wear-condition of the gearbox according to the angular position signals of the angular shaft encoders and at least one translational displacement signal from the at least one displacement sensor, and provide a condition-signal representative of the wear-condition of the gearbox,
wherein:
the first and/or second shaft has a further angular shaft encoder and a twist of the shaft is determined by the calculation unit according to the difference in relative angular positions of the angular shaft encoders; and
a torque load signal is generated by the calculation unit according to the twist and the shaft's stiffness.

12. A method of monitoring wear of a power station gearbox in a power station, the power station gearbox comprising at least the following components:
at least a first shaft;
at least a second shaft;
cogwheels; and
bearings,
the method comprising:
providing a gearbox monitoring device for the power station gearbox;
the gearbox monitoring device comprising:
a first angular shaft encoder for the first-shaft of the power station gearbox, which angular shaft encoder is configured to sense a first angular position signal,
at least a second angular shaft encoder for the a second-shaft of the power station gearbox, which angular shaft encoder is configured to sense at least a second angular position signal,
at least one displacement sensor for sensing displacements of a shaft of the power station gearbox in at least one translational degree of freedom, and
a calculation unit configured to monitor a wear-condition of the power station gearbox according to the angular position signals of the angular shaft encoders and at least one translational displacement signal from the at least one displacement sensor, and provide a condition-signal representative of the wear-condition of the power station gearbox;
sensing the first angular position, of the first shaft by the first rotational shaft encoder;
sensing the second angular position, of the second shaft by the second rotational shaft encoder;

monitoring the wear of the power station gearbox according to differences of the sensed angular positions of the first shaft and second shaft; and
generating a condition-signal representative of the wear of the power station gearbox according to the monitored differences,
comprising:
an additional sensing of a displacement of the first shaft and/or the second shaft in at least one additional degree of freedom; wherein
the displacement in the additional degree of freedom is comprised in the monitoring and generation of the condition-signal as an indication of wear.

13. The method according to claim 12, wherein the power station is a wind power station, a waterwheel power plant, or a tidal power plant.

14. The method according to claim 12, wherein the additional sensing of the displacement of the first shaft and/or the second shaft in at least one additional degree of freedom comprises an axial and/or eccentric displacement caused by wear of at least one of the components of the gearbox.

15. The method according to claim 12, wherein the sensing of the angular position and of the displacement at one of the shafts is carried out by one single sensor, which is sensing in at least two degrees of freedom.

16. The method according to claim 15, wherein the one single sensor comprises:
a code carrier and a sensor arrangement, code carrier and sensor arrangement being rotatable relative to each other as a first degree of freedom;
and the sensing comprises:
generating a code projection, dependent on the three-dimensional displacement of the code carrier relative to the sensor arrangement, onto the sensor arrangement and detection of at least a part of the code projection;
determining the angular position of the code carrier from the code projection; and
determining a displacement value for the at least one additional degree of freedom of the code carrier relative to the sensor arrangement on the basis of the code projection.

17. The method according to claim 16, wherein an axial displacement of the sensor arrangement relative to the code carrier and/or the eccentricity of the sensor arrangement relative to the code carrier is determined.

18. The method according to claim 12, wherein at least two angular positions at different axial locations on each of the first and/or second shaft are sensed and a twist of the respective shafts is determined.

19. The method according to claim 18, wherein the different axial locations are chosen so that a torque loaded shaft-section is in-between of the axial locations.

20. The method according to claim 19, wherein the torque load is determined dependent from the angular position differences and a known or presumed shaft stiffness.

21. The method according to claim 18, wherein the efficiency and/or losses of the power station gearbox are determined according to the sensed positions and/or displacements and the determined torque load.

22. The method according to claim 12, wherein the condition of the bearings is monitored according to a sensed axial and/or eccentric displacement of the shafts.

23. The method according to claim 12, wherein the condition of the bearings is monitored comprising a loose pre-stressing and/or a radial run-out of the bearings according to a sensed axial and/or eccentric displacement of the shafts.

24. The method according to claim 12, wherein each of the shafts in the power station gearbox are sensed with respect to their actual location and/or orientation in at least two degrees of freedom.

25. The method according to claim 24, wherein an angular position and axial and/or eccentric displacements are sensed by the least one sensor on each of the shafts in the power station gearbox.

26. The method according to claim 25, wherein the sensing of the angular position and axial and/or eccentric displacements by the least one sensor on each of the shafts in the power station gearbox is time synchronized.

27. The method according to claim 12, wherein an additional sound/vibration monitoring of the power station gearbox is performed.

28. The method according to claim 27, wherein the positional and displacement monitoring covers the lower frequency range of the evaluated wear indications and the sound/vibration monitoring covers the upper frequency range of the evaluated wear indications.

29. The method according to claim 12, wherein a managing of a lifecycle of the power station gearbox according to the wear condition-signal by determining an allowable load condition to be applied to the power station gearbox is determined.

30. The method according to claim 29, wherein the allowable load condition to be applied to the power station gearbox is determined by equalizing an expected lifecycle of a plurality of power stations in a wind park based on their individual wear conditions.

31. A machine readable medium comprising a computer program product with program code being stored on the machine readable medium, the program code being configured to automatically execute and operate the method of monitoring a wear of a power station gearbox according to claim 12.

32. A gearbox monitoring device for a power station gearbox, the gearbox monitoring device comprising:
   a first angular shaft encoder for a first-shaft of the power station gearbox, which angular shaft encoder is configured to sense a first angular position signal,
   at least a second angular shaft encoder for at least a second-shaft of the power station gearbox, which angular shaft encoder is configured to sense at least a second angular position signal,
   at least one displacement sensor for sensing displacements of a shaft of the gearbox in at least one translational degree of freedom, and
   a calculation unit configured to monitor a wear-condition of the gearbox according to the angular position signals of the angular shaft encoders and at least one translational displacement signal from the at least one displacement sensor, and provide a condition-signal representative of the wear-condition of the gearbox,
   wherein an intermediate-stage-shaft of the gearbox is equipped with a sensor.

* * * * *